E. F. SOBERS.
DOUGH SHAPER.
APPLICATION FILED APR. 20, 1909.

944,289.

Patented Dec. 28, 1909.
2 SHEETS—SHEET 1.

Witnesses
Theo. Rosemann
J. A. L. Mulhall

Inventor
Eugene F. Sobers,

By Joshua R. H. Potts
Attorney

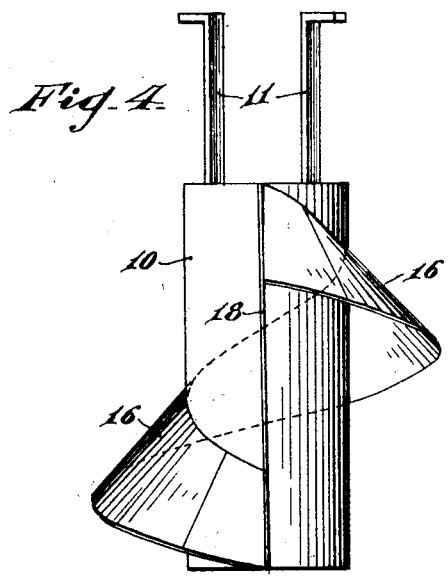
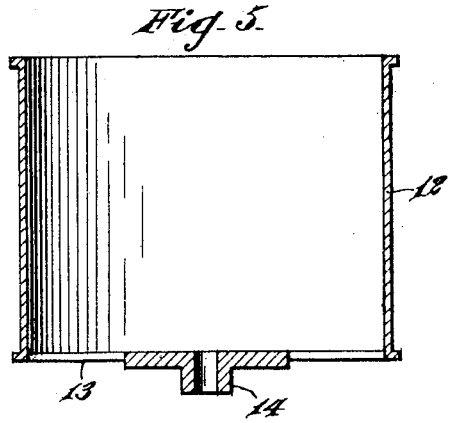
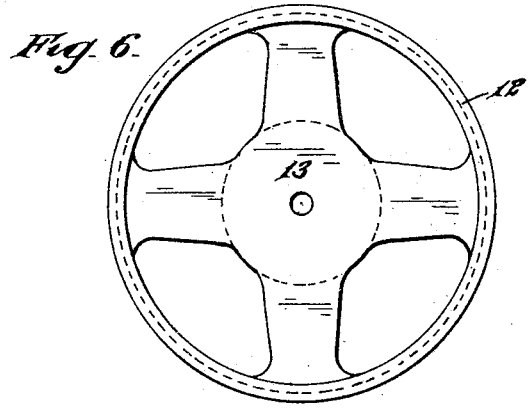
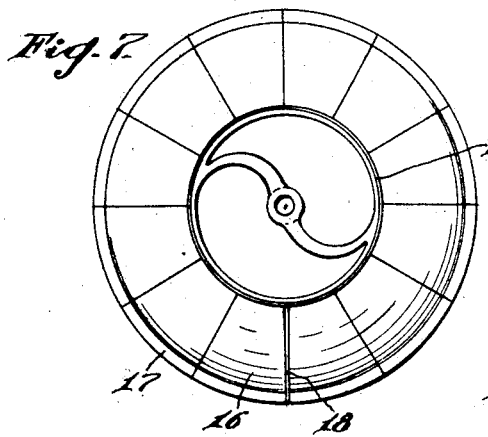
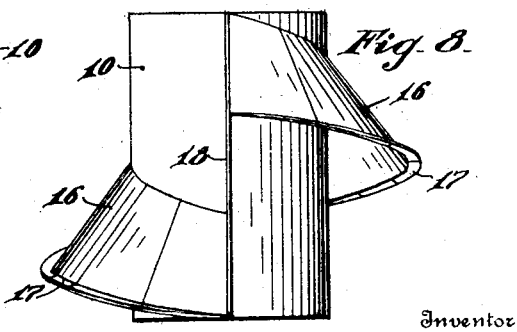

UNITED STATES PATENT OFFICE.

EUGENE F. SOBERS, OF BETHLEHEM, PENNSYLVANIA.

DOUGH-SHAPER.

944,289.  Specification of Letters Patent.  Patented Dec. 28, 1909.

Application filed April 20, 1909. Serial No. 491,081.

*To all whom it may concern:*

Be it known that I, EUGENE F. SOBERS, a citizen of the United States, residing at Bethlehem, in the county of Lehigh and State of Pennsylvania, have invented certain new and useful Improvements in Dough-Shapers, of which the following is a specification.

My invention relates to an improved dough shaper, the object of the invention being to provide an improved apparatus, which will roll a quantity of dough into a ball, and eject the same at the upper end of the apparatus ready for baking.

With this and other objects in view, the invention consists in certain novel features of construction, and combinations and arrangements of parts as will be more fully hereinafter described and pointed out in the claims.

Figure 1:
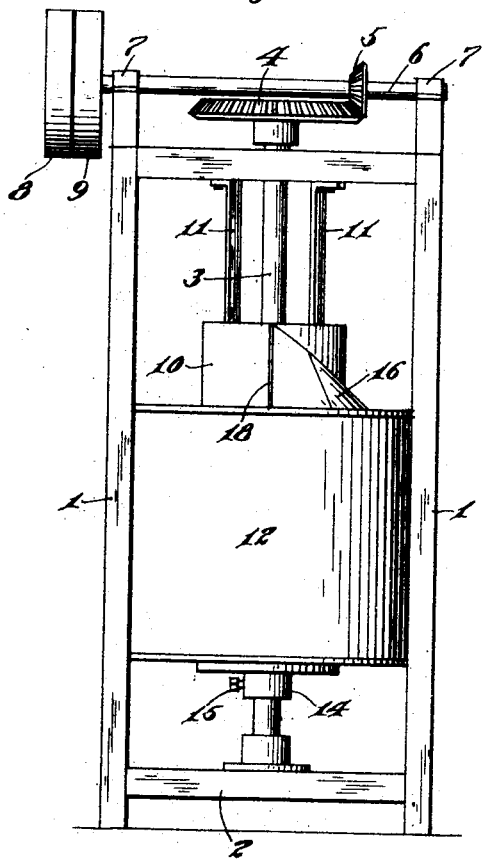
Figure 2:
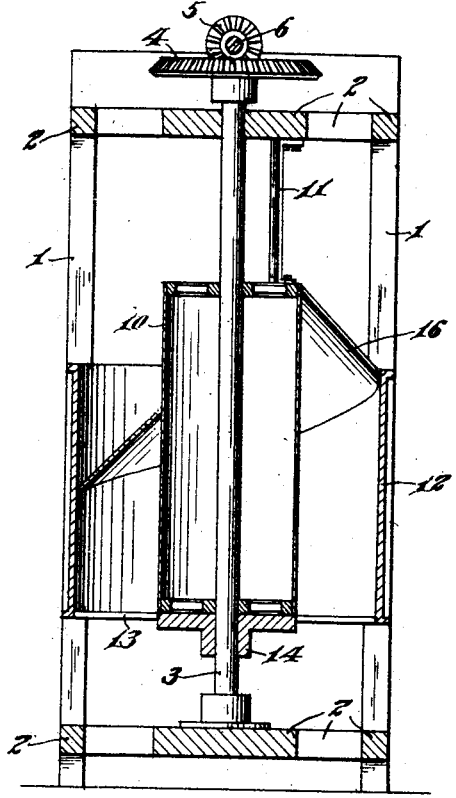
Figure 3:
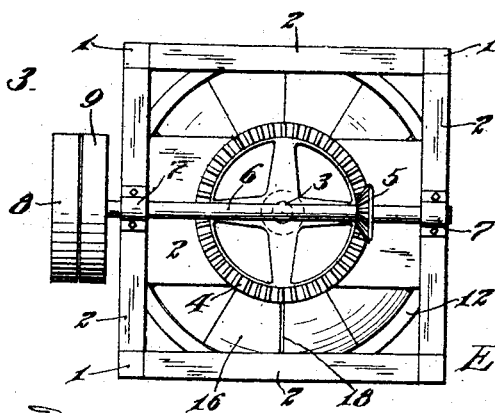

In the accompanying drawings, Figure 1, is a view in side elevation illustrating my improvements. Fig. 2, is a view in longitudinal section. Fig. 3, is a top plan view. Fig. 4, is a detail view in elevation of the inner cylinder removed. Fig. 5, is a view in longitudinal section of the outer cylinder. Fig. 6, is a top plan view of the outer cylinder. Figs. 7 and 8, are views illustrating a modification.

My improved apparatus is supported upon a frame work comprising four uprights 1, connected by horizontal bars 2, forming a rectangular frame.

3 represents a vertical shaft supported at the center of the frame, and having a beveled gear wheel 4, fixed upon its upper end and in mesh with a beveled pinion 5 on a horizontal shaft 6 supported in suitable bearings 7 at the upper end of the frame, and having fast and loose pulleys 8 and 9 thereon, to which power may be transmitted by a belt from any desired source.

10 represents a vertical cylinder, which is secured to depending arms or brackets 11, the latter secured to the upper cross bars 2 of the frame work, and positioning the cylinder at the center of the frame.

12 represents an outer cylinder, which has a spider base 13, provided with a sleeve 14 to receive shaft 3, and be secured thereto by means of a set screw 15, so that the outer cylinder 12 will be turned when the shaft is revolved.

Secured around the inner cylinder 10 is an inclined helical flange or track 16, which is preferably made up in sections as shown, and secured to the cylinder 10 in any approved manner. This flange or track extends from the lower to the upper end of the cylinder, and extends outwardly from the inner cylinder to the inner face of the outer cylinder.

The operation is as follows: A piece of dough of the proper weight is dropped into the outer cylinder, and due to the friction between the flange or track 16 and the outer cylinder 12, the dough will be rolled up the track and will be ejected over the top of cylinder 12 in the form of a round ball ready for baking.

In the modification shown in Figs. 7 and 8, the flange or track 16 is provided at its lower edge with an approximately horizontal extension 17, which latter compels the casing and track to exert a lesser pressure on the ball of dough, and in some cases with a certain kind of dough such a structure would be most desirable.

To prevent any possibility of the dough falling below the lower end of the helical track 16, I provide a plate 18, which is secured to cylinder 10 and to the ends of the helical track as clearly shown in Figs. 4 and 8.

I do not limit myself to any particular angle or length of the flange or track 16, as this may of course be varied to suit conditions, and I do not limit myself to the precise details set forth, but consider myself at liberty to make such changes and alterations as fairly fall within the spirit and scope of the claims.

Having thus described my invention what I claim as new and desire to secure by Letters Patent is:

1. In a dough shaper, the combination with a rotary cylinder, of a stationary inner cylinder, a helical track-way fast to said inner cylinder, and extending outward approximately from the inner to the outer cylinder, and a plate secured to the inner cylinder and extending across the ends of the helical track-way.

2. In a dough shaper, the combination with a frame, a vertical shaft mounted in the frame, means for transmitting motion to said vertical shaft, a cylinder secured to said shaft, an inner cylinder secured to the frame, a helical track-way fast to the inner cylinder, and extending approximately to the inner face of the outer cylinder, and a plate secured to the inner cylinder and extending across the ends of the helical track-way.

3. In a dough shaper, the combination with a frame, a vertical shaft mounted in the frame, means for transmitting motion to said vertical shaft, a cylinder secured to said shaft, an inner cylinder secured to the frame, and a helical track-way fast to the inner cylinder, and extending approximately to the inner face of the outer cylinder, and a plate secured to the inner cylinder and extending across the ends of the helical track-way.

In testimony whereof I have signed my name to this specification in the presence of two subscribing witnesses.

EUGENE F. SOBERS.

Witnesses:
R. H. KRENKEL,
J. A. L. MULHALL.